(12) United States Patent
Frunzetti et al.

(10) Patent No.: US 6,401,670 B2
(45) Date of Patent: Jun. 11, 2002

(54) DEVICE FOR REGULATING THE TEMPERATURE OF OIL

(75) Inventors: Barbu Frunzetti, Kornwestheim; Erwin Olescher, Bietigheim, both of (DE)

(73) Assignee: Behr Thermot-tronik GmbH & Co, (DE)

( * ) Notice: Subject to any disclaimer, the term of this patent is extended or adjusted under 35 U.S.C. 154(b) by 0 days.

(21) Appl. No.: 09/837,080

(22) Filed: Apr. 18, 2001

(30) Foreign Application Priority Data

Apr. 18, 2000 (DE) .......................... 100 19 029

(51) Int. Cl.[7] .................................. F01M 5/00
(52) U.S. Cl. ................................... 123/41.31
(58) Field of Search ............... 123/196 AB, 41.33, 123/41.31, 41.42, 41.44, 41.29, 41.1, 196 V; 165/298; 236/12.15

(56) References Cited

U.S. PATENT DOCUMENTS

| | | | |
|---|---|---|---|
| 5,960,872 A | | 10/1999 | Huemer et al. |
| 6,053,131 A | * | 4/2000 | Mueller et al. .......... 123/41.31 |
| 6,065,682 A | * | 5/2000 | Frunzetti ................. 236/12.15 |
| 6,182,749 B1 | | 2/2001 | Brost et al. |
| 6,196,168 B1 | * | 3/2001 | Eckerskorn et al. ..... 123/41.33 |

FOREIGN PATENT DOCUMENTS

| | | |
|---|---|---|
| DE | 196 06 202 A1 | 8/1997 |
| DE | 197 15 324 A1 | 10/1998 |
| EP | 0 787 929 A2 | 8/1997 |
| EP | 0 916 816 A1 | 5/1999 |
| GB | 2312739 | * 11/1997 |

* cited by examiner

Primary Examiner—Marguerite McMahon
Assistant Examiner—Hyder Ali
(74) Attorney, Agent, or Firm—Kennedy Covington Lobdell & Hickman, LLP

(57) ABSTRACT

A device for regulating transmission oil temperature having a heat exchanger through which the oil flows and to which coolant from an internal combustion engine can be supplied through at least one valve controlled by a thermostatic operating element immersed in the oil, the device includes a flow control body attached to a heat exchanger in a flange-like manner, the flow control body containing an oil channel connected to an oil outlet of the heat exchanger into which a housing enclosing the thermostatic operating element projects for the detection of and response to the temperature of the oil exiting the heat exchanger, the thermostatic operating element having a work piston connected to an extension member which is connected to the at least one valve in the flow control body, the valve disposed between at least one coolant inlet and a coolant opening to the heat exchanger.

12 Claims, 2 Drawing Sheets

DEVICE FOR REGULATING THE TEMPERATURE OF OIL

CROSS REFERENCE TO RELATED APPLICATION

This application claims the benefit of German Application DE P 10019029.4 filed Apr. 18, 2000, herein incorporated by reference.

FIELD OF THE INVENTION

The present invention relates to a device for regulating, i.e., cooling and heating, oil, in particular transmission oil of a vehicle transmission, having a heat exchanger through which the oil flows and to which cooled and/or hot coolant from an internal combustion engine can be supplied through at least one valve controlled by a thermostatic operating element which is immersed in the oil.

BACKGROUND OF THE INVENTION

A device for cooling the transmission oil of a vehicle transmission is known from U.S. Pat. No. 6,182,749 (European Patent Publication EP 0 916 816 A1). In this construction, a cover, which is fastened on the heat exchanger, has an inlet for coolant for the motor that leads to a coolant opening of the heat exchanger. A valve, actuated by a thermostatic operating element, is disposed between the coolant inlet and the coolant opening. The housing of the thermostatic operating element projects into an oil channel of the heat exchanger.

A device for regulating the temperature of transmission oil is also known from U.S. Pat. No. 5,960,872 (European Patent Publication EP 0 787 929 A2), wherein the housing of a thermostatic operating element is arranged in an oil inlet of a heat exchanger. The work piston of the thermostatic operating element actuates two valves—one valve which controls the inflow of the cooled coolant to the heat exchanger and a second valve which controls the inflow of non-cooled coolant to the heat exchanger.

OBJECT AND SUMMARY OF THE INVENTION

The object of the invention is to provide a device for regulating the temperature of oil, particularly transmission oil of a vehicle transmission, that requires as little as possible structural space.

This object is attained by providing a flow control body that can be attached to a heat exchanger in a flange-like manner and which contains an oil channel that can be connected to an oil outlet of the heat exchanger and a housing that encloses a thermostatic operating element whose work piston is connected with a valve housed in the flow control body and disposed between at least one inlet of the flow control body for coolants and a coolant opening to the heat exchanger.

The flange-shaped flow control body of the present invention has a very thin profile. Thus, the present invention can perform the regulation of oil temperature without an extensive structural space being required.

In a specific embodiment of the present invention, the flange-shaped flow control body is designed as a support element of the heat exchanger. In this embodiment, the flow control body can be positioned, for example, between an oil sump of a motor vehicle transmission and the heat exchanger.

In another specific embodiment of the present invention, redundant capabilities are provided to increase the reliability and constancy of the temperature regulation.

Further details, features and advantages of the present invention will be understood from the following disclosure of exemplary embodiments with reference to the accompanying drawings.

DETAILED DESCRIPTION OF THE PREFERRED EMBODIMENT

Figure 1:
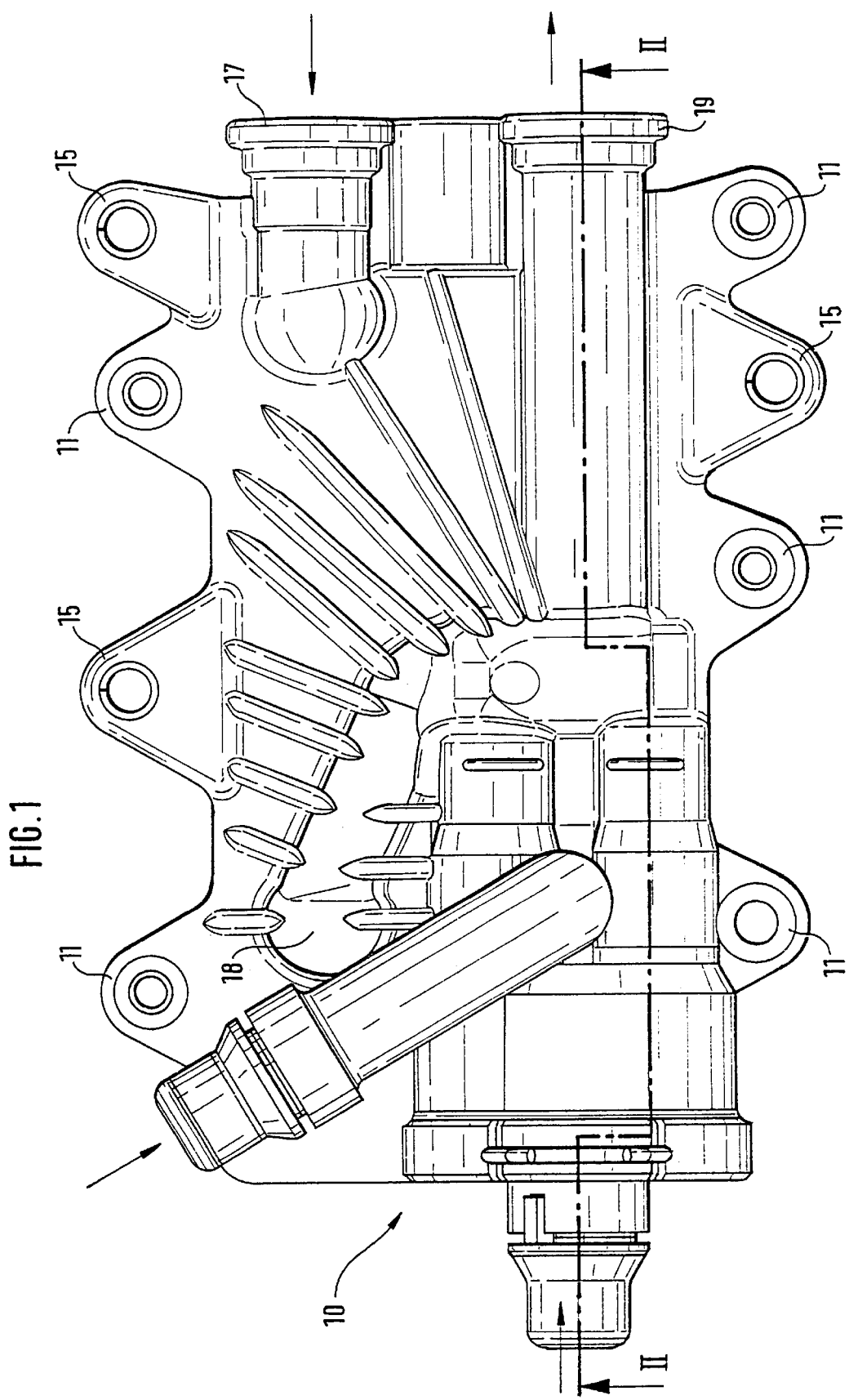
FIG. 1 is a plan view of a flange-shaped flow control body and heat exchanger of the present invention.
Figure 2:
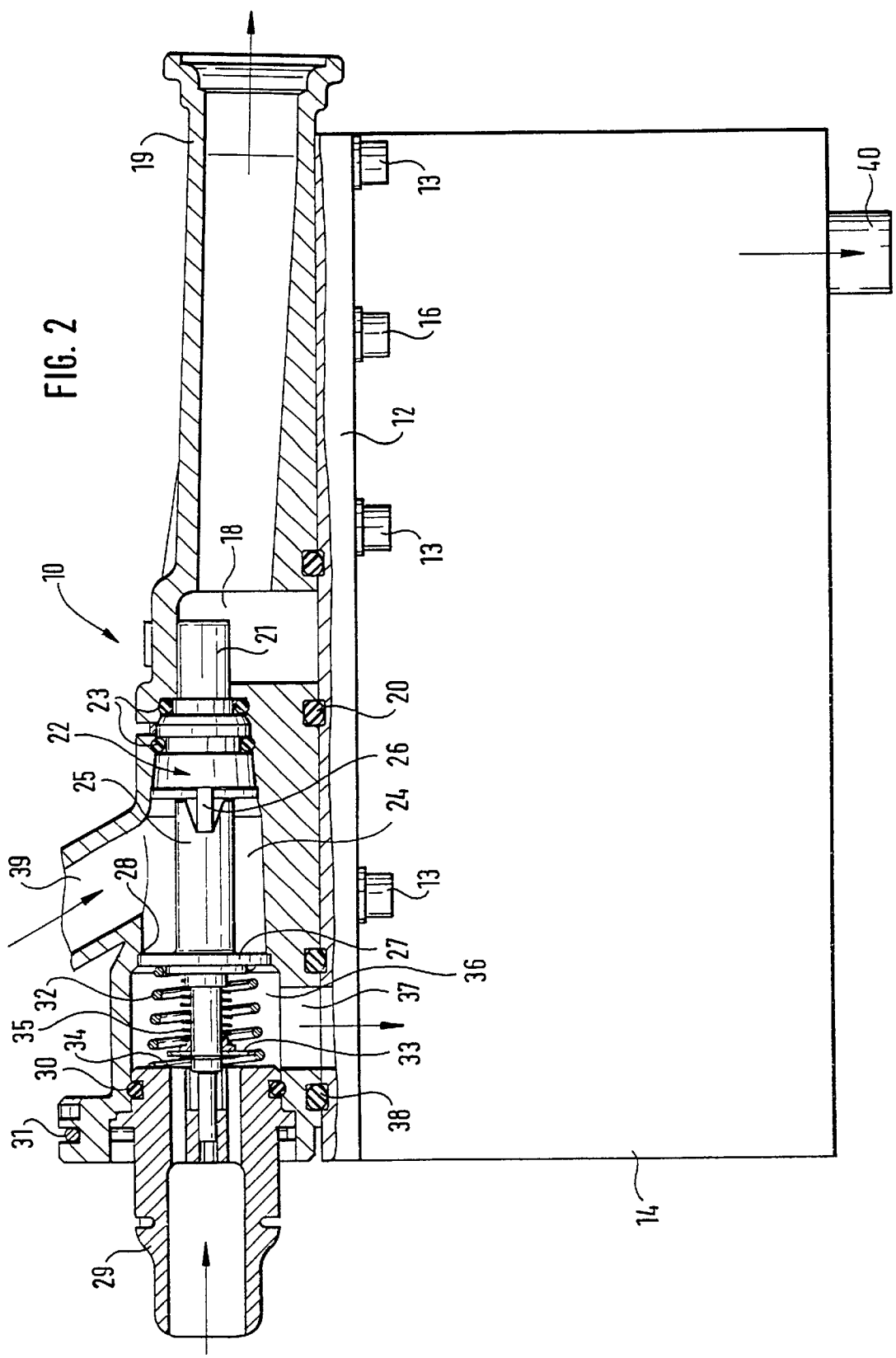
FIG. 2 is a sectional view of the flow control body and heat exchanger viewed along line II—II in FIG. 1.

The flange-shaped flow control body 10, shown in FIGS. 1 and 2, molded from plastic and metal, has fastening eyes 11, with which it can be fastened by bolts 13 to a cover plate 12 of a heat exchanger 14. Additional fastening eyes 15 can be used to fasten the flow control body 10 to a motor vehicle component, in particular an oil sump, by bolts 16. The heat exchanger 14 is used as an oil cooler, by means of which the oil of the vehicle transmission can be regulated.

The flow control body 10 has an inlet 17 for transmission oil, for example, which is connected to an oil intake of cover plate 12 of the heat exchanger 14 (not shown). An oil channel 18, formed as a chamber into the flow control body 10, leads from an oil outlet of the heat exchanger 14 to an oil return 19 located on the flow control body 10. The oil channel 18 is sealed against the cover plate 12 by a circumferential sealing 20.

The oil inlet 17 and the oil return 19 for the transmission oil are located in the front face of the flow control body 10. A conventional thermostatic operating element 22, containing an expandable material, e.g., a wax mixture, is enclosed in housing 21 and protrudes into the oil channel 18 in the direction of the front face of the flow control body 10, so that the thermostatic operating element 22 to detects and responds to the temperature of the oil flowing from the oil outlet of the heat exchanger 14 into the oil channel 18. The thermostatic operating element 22 extends into the coolant conduit 24, which extends through the flow control body to an opening at the face of the flow control body opposite the front face. A first valve includes valve disk 27 which adjustably seals a portion of coolant conduit 24, with valve seat 28 facing away from the thermostatic operating element 22. Work piston 26, operably connected to the thermostatic operating element 22, extends into the coolant conduit 24. The work piston 26 and an associated extension member 25 extend through the coolant conduit 24. Valve disk 27 of the first valve is affixed to extension member 25.

The housing 21 of the thermostatic operating element 22 is seated against and engages annular sealing rings 23 that are seat in the flow control body 10 to seal the oil chamber from coolant passing through the coolant conduit. The housing 21 of the thermostatic operating element 22 is secured between the sealing rings 23 by a conventional spring clip, which can be inserted from the exterior of the flow control body 10.

Guide element 29 is inserted into the end of the coolant conduit 24 through the opening in the flow control body 10 opposite the front face of the flow control body 10. A sealing ring 30 is disposed between the guide element 29 and the wall of the flow control body 10 surrounding the coolant conduit 24 to seal the interior of the coolant conduit from the exterior environment. The guide element is also secured to the flow control body 10 by a spring clip 31. The guide element 29 is used as an axial guide for extension member 25. A pre-stressed restoring spring 32 used for the work piston 26 is disposed between the valve disk 27 and the end of the guide element 29.

A second valve is located between the first valve and the guide element 29. Displaceable valve disk 33 of the second valve is affixed to the extension member 25. The second valve has a valve seat 34 formed by the guide element 29. The valve disk 33 is maintained by an inner helical spring 35 against a locking ring on the extension member 25.

Mixing chamber 36, which is the portion of the cooling conduit 24 located between the first and second valves, is connected to the heat exchanger 14 by coolant opening 37. The coolant opening 37 is sealed against the cover plate 12 by sealing ring 38.

The first valve and the second valve are both affixed to the extension member 25 such that the valves move simultaneously. Furthermore, the first valve seat 28 and the second valve seat 34 are on opposite sides of their respective valve disks 27, 33, so that the movement of the extension member 25 opens one valve while simultaneously closing the other valve by a corresponding amount. Thus, when the first valve is completely closed, the second valve is completely open and, conversely, when the second valve is completely closed, the first valve is completely open. Movement of the extension member 25 intermediate these two extremes results in both valves being open by varying amounts.

In a preferred embodiment, a first coolant inlet 39 connects to the coolant conduit 24 at one end and is connected to a coolant cooler, e.g., a vehicle radiator, at the other end (not shown). Thus, cooled coolant from the internal combustion engine can be supplied to the heat exchanger 14. A second coolant inlet, formed within guide element 29, is connected with a coolant outlet of the internal combustion engine, so that heated or hot coolant is supplied to the heat exchanger 14 through the second coolant inlet. The heat exchanger 14 has a coolant return 40.

The present invention is used as follows: If the temperature of the transmission oil in the oil channel 18, is less than the desired minimum temperature, the first valve with valve disk 27 and valve set 28 remains closed, and the second valve with valve disk 33 and valve seat 34 is open. This configurations allows heated or hot coolant from the internal combustion engine to flow into the heat exchanger 14 through the coolant inlet formed in guide element 29. When transmission oil has reached the desired temperature, as detected by the thermostatic operating element 22, the thermostatic operating element 22 actuates work piston 26, which causes the extension member 25 to travel in the coolant conduit 24 toward the guide element 29 so that the valve disk 27 is partially opened and the second valve disk 33 is partially closed. In this configuration of the present invention, the thermostatic operating element 22 regulates the coolant flows from the cooled coolant inlet 39 and the heated coolant inlet formed in the guide element 29, both of which allow flow into the mixing chamber 36 from the coolant cooler on the one side and from the engine on the other side, in such a way that the transmission oil temperature is maintained as constant as possible. If the desired temperature of the transmission oil is exceeded, the work piston 26 is further extended, causing the extension member 25 to travel further in the coolant conduit 24, so that the valve disk 33 is fully seated against guide element 29, completely closing the second valve and thus preventing any flow of heated coolant into the mixing chamber 36. Simultaneously, the first valve is completely opened permitting cooled coolant into the mixing chamber 36. In this configuration of the present invention, only cooled coolant is supplied to the heat exchanger 14, cooling the transmission oil.

In a preferred embodiment, the flow control body 10 contains two thermostatic operating elements 22, which are arranged parallel to each other and operate in the same direction. The two thermostatic elements 22 are calibrated to respond in the identical fashion when subjected to the same temperature. The thermostatic operating elements 22 are enclosed separately in the flow control body adjacent to each other and project into the oil channel 18. The work pistons 26 of the two thermostatic operating elements 22 act on the common extension member 25. Thus, the extension member 25 is controlled by two thermostatic operating elements. The dual configuration of this embodiment assures that the temperature regulation is maintained even if one of the thermostatic operating elements should fail, for example because of the loss of the expandable material.

It will therefore be readily understood by those persons skilled in the art that the present invention is susceptible of broad utility and application. Many embodiments and adaptions of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A device for regulating oil temperature, particularly transmission oil of a vehicle transmission, having a heat exchanger through which the oil flows and to which coolant from an internal combustion engine can be supplied through at least one valve controlled by at least one thermostatic operating element immersed in the oil, the device comprising:

a flow control body attachable to the heat exchanger, the flow control body having an oil channel formed therein and connecting an oil outlet of the heat exchanger to an oil return of the flow control body, a housing enclosing the thermostatic operating element, a first portion of the housing of the thermostatic operating element protruding into the oil channel for detecting and responding to the temperature of the oil in the oil chamber, a work piston operably connected to said thermostatic operating element and operably connected to the at least one valve, the at least one valve includes a first valve disposed between at least one coolant inlet of the flow control body and a coolant opening connecting the flow control body to the heat exchanger, and the heat exchanger having a coolant return;

wherein the flow control body includes a coolant conduit having a first end extending into the oil channel and forming a seat for a second portion of the housing of the thermostatic operating element projecting into the coolant conduit.

2. The device according to claim 1, wherein the flow control body includes a first coolant inlet for coolant from a coolant cooler and a second coolant inlet for coolant from the internal combustion engine and wherein said at least one valve controls flow of coolant from said first and second coolant inlets to said coolant opening to said heat exchanger.

3. The device according to claim 2, characterized further by a second valve for controlling flow of coolant from said second inlet into said heat exchanger, the first valve controlling flow of coolant from said first inlet into said heat exchanger.

4. The device according to claim 1, wherein said flow control body includes a guide element providing an axial guide for a valve operating extension member operably connected to the work piston of the thermostatic operating element.

5. The device according to claim 4, wherein the flow control body includes a first coolant inlet for coolant from a coolant cooler and a second coolant inlet for coolant from the internal combustion engine, the first coolant inlet connected therewith between the thermostatic operating element and said first valve, the second coolant inlet formed within the guide element.

6. The device according to claim 5, wherein the flow control body includes a second valve disposed between said first valve and said guide element, said second valve operably connected to the extension member.

7. The device in accordance with claim 6, wherein said first valve has a valve disk for seating against a valve seat forward in the flow control body when closed and a prestressed restoring spring surrounding the extension member and disposed between the guide element and the valve disk for urging the first valve disk in valve closing position, and said second valve has a valve disk for seating against valve seat formed by the guide element such that the second valve is opening and closing in reverse of the opening and closing of the first valve.

8. The device according to claim 7, wherein the flow control body includes a mixing chamber situated between the first and second valves, the first and second coolant inlets connected to the mixing chamber by the first and second valves, respectively, and the mixing chamber connected with the coolant opening to the heat exchanger, the first valve operating to prevent flow from the first inlet into the mixing chamber until a minimum oil temperature is reached and the second valve operating to prevent flow from the second inlet into the mixing chamber if the temperature of the oil exceeds a maximum temperature.

9. The device in accordance with claim 8, wherein the mixing chamber is formed by a portion of the coolant conduit defined on a first end by the valve seat of said first valve and on the second end by the valve seat of the second valve.

10. The device according to claim 1, wherein the flow control body is a molded part.

11. The device according to claim 1, characterized in that the flange-shaped flow control body is used as a support element of the heat exchanger.

12. The device according the claim 1, characterized further by two of said thermostatic operating elements having work pistons interconnected to a common extension member for controlling said at least one valve.

* * * * *